(12) United States Patent
Carpiaux et al.

(10) Patent No.: US 6,357,770 B1
(45) Date of Patent: Mar. 19, 2002

(54) IN-WHEEL SUSPENSION

(76) Inventors: André Carpiaux, 1264 Ocean Ave., Emeryville, CA (US) 94608-1148; William D. T. Davis, 4311 Torres Ave., Fremont, CA (US) 94536; Ivan Junju Huang, 47565 Zunic Dr., Fremont, CA (US) 94539; Andreas Kaiser, 1931 Argonne Dr., Walnut Creek, CA (US) 94598-1204; Alexander S. Ko, 1275 Vicente Dr. #193, Sunnyvale, CA (US) 94086; Martin Koebler, 47565 Zunic Dr., Fremont, CA (US) 94539; Timothy James Loew, 535 Liberty St. #303, El Cerrito, CA (US) 94530

( * ) Notice: Subject to any disclaimer, the term of this patent is extended or adjusted under 35 U.S.C. 154(b) by 0 days.

(21) Appl. No.: 09/684,558

(22) Filed: Oct. 5, 2000

Related U.S. Application Data

(60) Provisional application No. 60/158,339, filed on Oct. 7, 1999.

(51) Int. Cl.[7] .................................................. B60G 3/99
(52) U.S. Cl. .......................... 280/124.127; 280/124.125
(58) Field of Search ................... 280/124.125, 124.127, 280/124.157

(56) References Cited

U.S. PATENT DOCUMENTS 6,131,932 A  * 10/2000  Bunker ........................ 280/88
6,257,604 B1 *  7/2001  Laurent et al. ....... 280/124.127

* cited by examiner

Primary Examiner—Eric Culbreth
Assistant Examiner—L. Lum
(74) Attorney, Agent, or Firm—Heller Ehrman White & McAuliffe LLP

(57) ABSTRACT

The wheel suspension of the invention is a thin-profile wheel suspension system including spring and dampening mechanisms and an optional brake and drive motor, mounted to a suspension frame in a compact arrangement which permits all or most of the sprung components to be mounted within the volume enclosed by the rim of a wheel, and thus the wheel suspension of the invention may be referred to as an "in-wheel suspension". The wheel suspension comprises a hub plate assembly including hub bearings and axle. The hub plate is mounted to a suspension frame by a motion-controlling sliding mount assembly, which connects the hub plate to the suspension frame while it permits the hub plate to slidably move in response to wheel loads. In the preferred embodiment, the suspension frame includes two forks, each fork mounting a sliding rail mount assembly comprising a slide-and-rail mechanism aligned vertically on the suspension frame and mounted to the hub plate. A spring mechanism such as a conventional piston-type shock absorber is mounted connecting to both the hub plate and the suspension frame to provide resilient motion control of the hub plate in response to vehicle weight, vehicle motion and road shock.

16 Claims, 9 Drawing Sheets

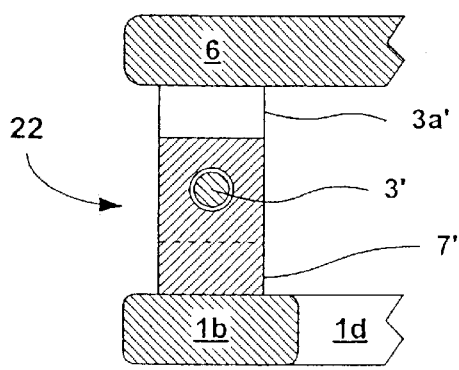
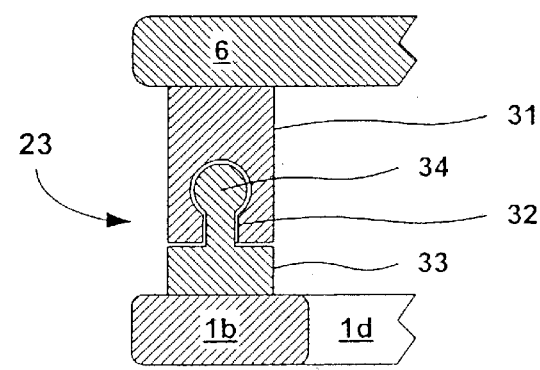
Figure 7A
Figure 7B
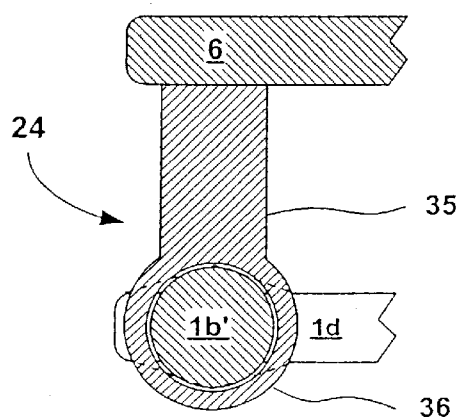
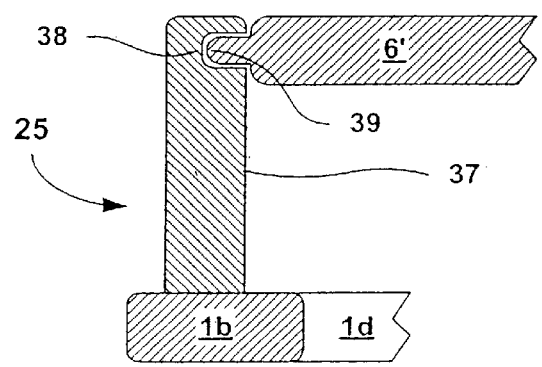
Figure 7C
Figure 7D

IN-WHEEL SUSPENSION

RELATED APPLICATION

The present application is based on U.S. Provisional Patent Application No. 60/158,339, filed Oct. 7, 1999, of the same title. This provisional application is incorporated by reference herein and the benefit of the filing date of this provisional application is hereby claimed under 35 U.S.C. §1.119(e).

FIELD OF THE INVENTION

The invention relates to wheel suspension and mounting assemblies for wheeled vehicles, and more particularly to a low-profile in-wheel suspension permitting a low aerodynamic drag installation, particularly suitable to light road vehicles and other wheeled vehicles.

BACKGROUND

Light road vehicles, such as electric vehicles, human powered vehicles, solar powered vehicles and the like, typically are required to utilize propulsive power in a highly efficient manner and to reduce aerodynamic drag to a high degree. In such cases, it is advantageous to mount a wheel on a streamlined assembly with a low overall frontal profile. Conventional automotive-type suspensions typically include a plurality of exposed struts, springs and other suspension components, each of which contributes to the overall aerodynamic drag. What is needed is a compact and streamlined suspension assembly with low frontal profile which absorbs and damps road impact and vibration, without a plurality of independently-exposed drag-producing components.

SUMMARY OF THE INVENTION

The wheel suspension of the invention relates to a thin-profile wheel suspension system including spring and dampening mechanisms and an optional braking mechanism. These wheel suspension components are mounted to a suspension frame in a compact arrangement which typically permits all or most of the moving (sprung) suspension components to be mounted within the volume enclosed by the rim of a wheel, i.e., within the internal volume defined by the concave surface formed by the wheel and rim. Due to this configuration, the compact low-profile wheel suspension of the invention may be referred to as an "in-wheel suspension".

The wheel suspension of the invention comprises a hub mounting assembly or hub plate assembly which comprises a hub/bearing assembly including an axle and preferably doubly clamped bearings. The bearings may be conventional ball bearings or tapered roller bearings. The hub/bearing assembly or hub plate may optionally include a brake mechanism, a drive motor or a power transmission mechanism.

The hub mounting assembly or hub plate is mounted and connected to a suspension frame by a motion-controlling inter-engaging sliding mount assembly, which connects the hub plate to the suspension frame while it permits the hub plate to slidably move in a controlled manner. The suspension frame is in turn typically mounted to a vehicle body or frame by conventional mounting means.

The inter-engaging sliding mount assembly connects to both the suspension frame and to the hub plate, and internally permits a sliding action in one direction or line of motion while maintaining a connection which is stable relative to motion in other directions or perpendicular to the permitted line of motion. The inter-engaging sliding mount assembly permits motion of the hub plate with one degree of freedom, e.g., vertical translation, while restraining motion of the hub plate in other degrees of freedom (e.g., laterally, front-to-rear and rotation).

Note that while the sliding motion permitted by the inter-engaging sliding mount assembly is typically in a straight line (e.g., along a straight guide rail or slot), the sliding mount assembly may permit sliding motion along a curved path (e.g., along a curved guide rail or slot). For purposes of this description, the terms "direction" or "line of motion" include sliding motion in a pre-selected curved path.

In the preferred embodiment, the sliding mount assembly comprises two pairs of slide-and-rail mechanisms aligned vertically on the suspension frame and mounted also to the hub plate. The suspension frame may be in the form of an fork-and-strut assembly in which two support forks extend spaced apart in parallel alignment vertically downward from a support strut. Each fork mounts one of the slide-and-rail mechanisms in parallel vertical alignment with each other. The hub plate attaches to the slide-and-rail mechanism on each side of the wheel hub, permitting vertical motion of the hub plate in the plane of the suspension forks.

In one embodiment, the slide-and-rail mechanism includes a rail mounted to each fork, each rail engaging one or more sliding rail mounts or sliders which wholly or partially surround the rail. The sliders attach to and support the hub plate. The rails and the sliders thus form a slidable connection between the wheel/ hub plate and the fixed suspension fork thereby holding the wheel securely in place. The sliding rails/rail mount linkage allows limited up and down movement of the wheel along the sliding rails in response to road shock. The sliding rails may be made of metal, an alloy or a polymer and/or comprise linear bearings.

A spring mechanism is mounted extending between and connecting to both the hub plate and the suspension frame or fork to provide resilient elastic motion control of the hub plate relative to the suspension frame in response to vehicle weight, vehicle motion and road shock. The spring mechanism preferably includes a damping device to dampen the movement of the hub plate and wheel, e.g., due to uneven road surfaces or terrain.

The preferred spring mechanism is at least one conventional piston-type shock absorber including both a spring and a fluid-flow damper in an integrated, elongate unit having mounting fittings at each end. Alternative spring mechanisms may be employed, such as coil springs, leaf springs, elastic cords or bungees, rubber compression springs and the like. Alternative damping devices may be included, such as frictional dampers and the like.

In the preferred embodiment, the shock absorber is mounted between the sliding hub mount and the fixed suspension fork in generally parallel alignment to the rails, using conventional fasteners and brackets to attach the mount fittings of the shock absorber to the fork and hub plate respectively. The lower part of the shock absorber is attached to the hub plate and the upper part is secured to the fixed suspension fork. In the preferred embodiment, the upper attachment is adjacent the base of the strut portion and the lower attachment is adjacent the bottom of the hub plate, to one side of the bearing and axle, to provide a compact arrangement.

A braking mechanism may be attached to the hub plate. Various alternative conventional types of brakes may be used, such as hub mounted disk brakes, drum brakes, bicycle-type caliper brakes, and the like. The preferred embodiment eliminates the need for a separate brake drum by mounting an opposed pair of brake pads and actuators, disposed to press outwardly from the hub assembly to bear upon the inner surface of the wheel rim.

The suspension of the invention allows for high ground clearance and low unsprung weight which reduces energy losses when the vehicle is in motion. The narrow frontal profile of the in-wheel suspension also improves the aerodynamic characteristics of the vehicle. Another advantage of this suspension design is the versatility of the in-wheel suspension which allows the vehicle to be driven on regular surface roads such as asphalt, concrete, etc. as well as dirt roads and in rugged terrain. One or multiple shock absorbers may be used. The shock absorbers may be of the air or oil-filled type, the coil-type, or be made of elastomer products. They are adapted to fit into the in-wheel suspension system.

The dampening effect of the shock absorber(s) along the sliding rails may be controlled electronically by a linear motor. The linear motor may be used to control the stiffness of the suspension, or it may be used to produce electricity like a generator. In another alternative embodiment, the hub assembly may include an in-wheel motor to allow for direct drive of the wheel from the electric motor.

In addition to controlling the dampening effect, the shock absorber or other spring mechanism can be adjusted to control the linear positioning, along the rails, of a fixed location on the slidable hub mount assembly relative to a fixed location on the suspension frame. Thus, not only can the suspension's dynamic response be controlled, but also the overall physical orientation of the device incorporating the invention. By way of example, when the preferred embodiment is employed on a wheeled vehicle, said vehicle's height above and angle with respect to the ground can be controlled.

BRIEF DESCRIPTION OF THE DRAWINGS

FIGS. 7A to 7D show a portion of exemplary embodiments of the wheel suspension of the of the invention including alternative slidably mounting mechanisms for the hub mounting plate.

DETAILED DESCRIPTION INCLUDING THE BEST MODES OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

In this regard, the invention is illustrated in the several figures, and is of sufficient complexity that the many parts, interrelationships, and sub-combinations thereof are best illustrated in several different figures. Accordingly, for purposes of clarity, certain of the figures show schematically, or omit, parts that are not essential in that figure to a description of a particular feature, aspect or principle of the invention being disclosed. Thus, the best mode embodiment of one feature may be shown in one figure, and the best mode of another feature will be called out in another drawing. Certain of the figures are electronically reproduced photographs which are used to illustrate a currently preferred embodiment of the invention.

Figure 1:
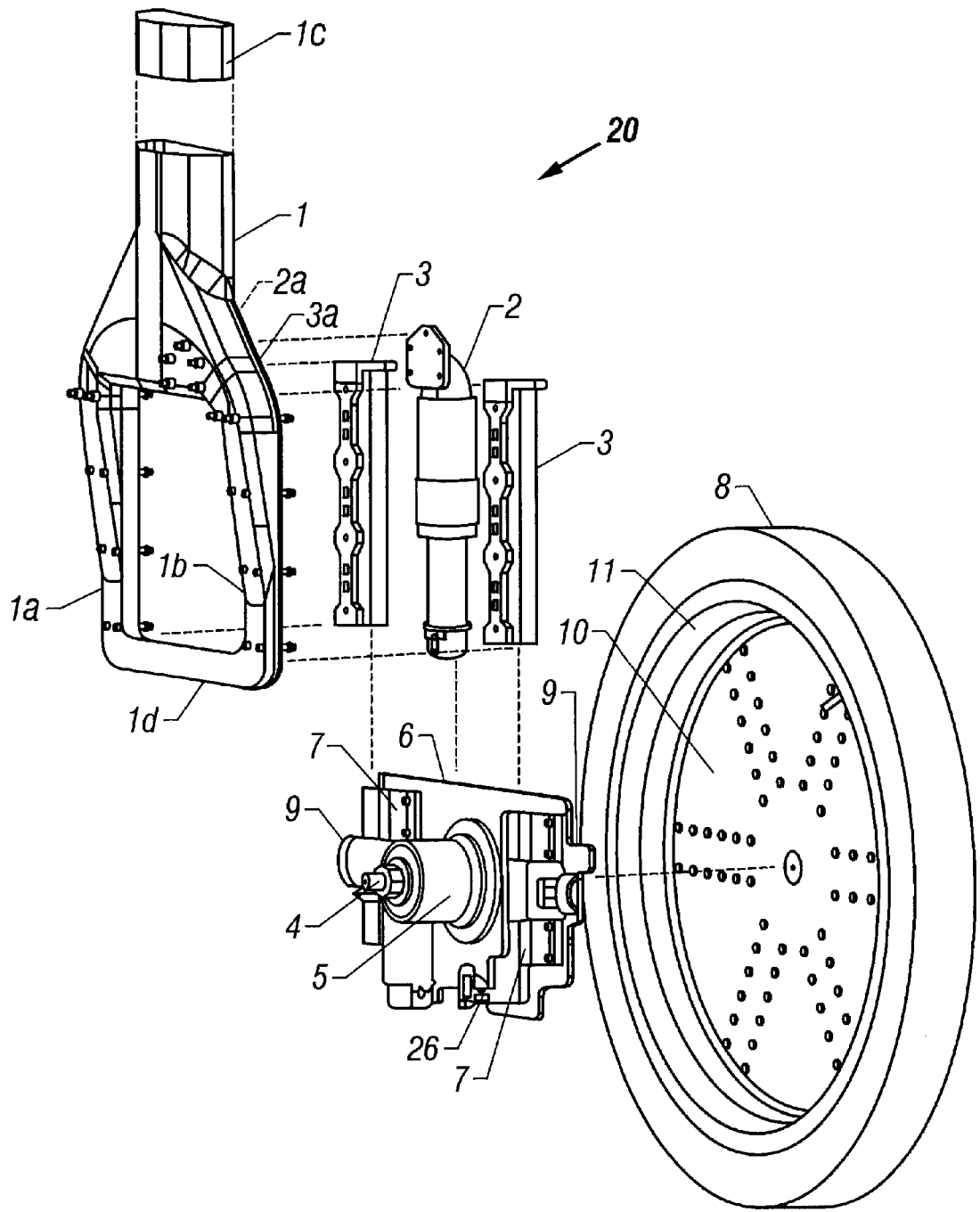
FIG. 1 is a exploded perspective view of one embodiment of the wheel suspension of the invention seen with the suspension fork in the left foreground and the wheel in the right rear.

FIG. 1 is a exploded perspective view of one embodiment of the wheel suspension 20 of the invention seen with the suspension fork or suspension frame 1 in the left foreground and the wheel in the right rear. This exemplary embodiment 20 of the wheel suspension of the invention comprises a suspension fork or frame assembly 1, which includes a left and a right fork tine portion 1a and 1b, respectively, which are spaced apart extending downward from the fork strut portion 1c. The lower ends of the fork tine portions 1a and 1b are preferably joined by fork closure portion 1d, to increase the structural integrity of the fork assembly 1. The fork assembly is typically fixed to a vehicle body by means of a fork strut portion 1c.

A shock-damping/spring assembly 2 (such as the conventional vehicle strut-type shock absorber shown) is mounted at one end to an upper shock absorber mount 2a fixed to the fork assembly. The shock absorber 2 is mounted at the opposite end to a lower shock absorber mount 2b which is fixed to a hub plate assembly 6. The hub plate assembly 6 is slidably mounted to the fork assembly 1 by means of one or more slides 7 each of which engages an elongate rail 3. In the example shown in FIG. 1, there is one elongate rail 3 mounted in vertical alignment along each of tines 1a and 1b. There is a corresponding slide 7 mounted on each side of hub plate 6 in parallel alignment to engage rails 3, so that the hub plate 6 is free to move vertically through a selected range of motion while being restrained from lateral or side-to-side movement.

The shock absorber 2 acts to exert a spring reaction and to dampen motion of plate 6. The shock absorber is selected to match anticipated wheel loads while maintaining a desired operative range of motion of plate 6. The hub mount plate 6 mounts a hub bearing assembly 5 which ratably mounts an axle 4.

The hub assembly is secured to the wheel 10 via the axle 4. The rim 11 of the wheel 10 shown mounts a tire 8. The suspension 20 may optionally include a brake mechanism 9 mounted to the plate 6. A pair of outwardly expanding caliper type brakes 9 are shown, in which one of two brake pads contact the surface on the inside rim 11 of the wheel 10. Other brake mechanisms may be included, such as disk brakes.

The wheel suspension 20 shown is un-powered, but drive motors or power transmission mechanisms may be included. Optionally, the spring mechanism 2 may omit a damping mechanism, such as a coil spring substituted for the shock absorber shown. Optionally more than one shock absorber 2 may be included, such as a pair mounted one on each side of hub 5. Optionally, the rails 3 may be fixed to plate 6 and the slides fixed to fork 1.

Note that the positions of the slides and rails may optionally be reversed, with slides mounted to the fork and the rails mounted to the hub mount. Alternatively, an inter-engaging channel and rail may be used in place of a plurality of discrete slides.

Figure 8:
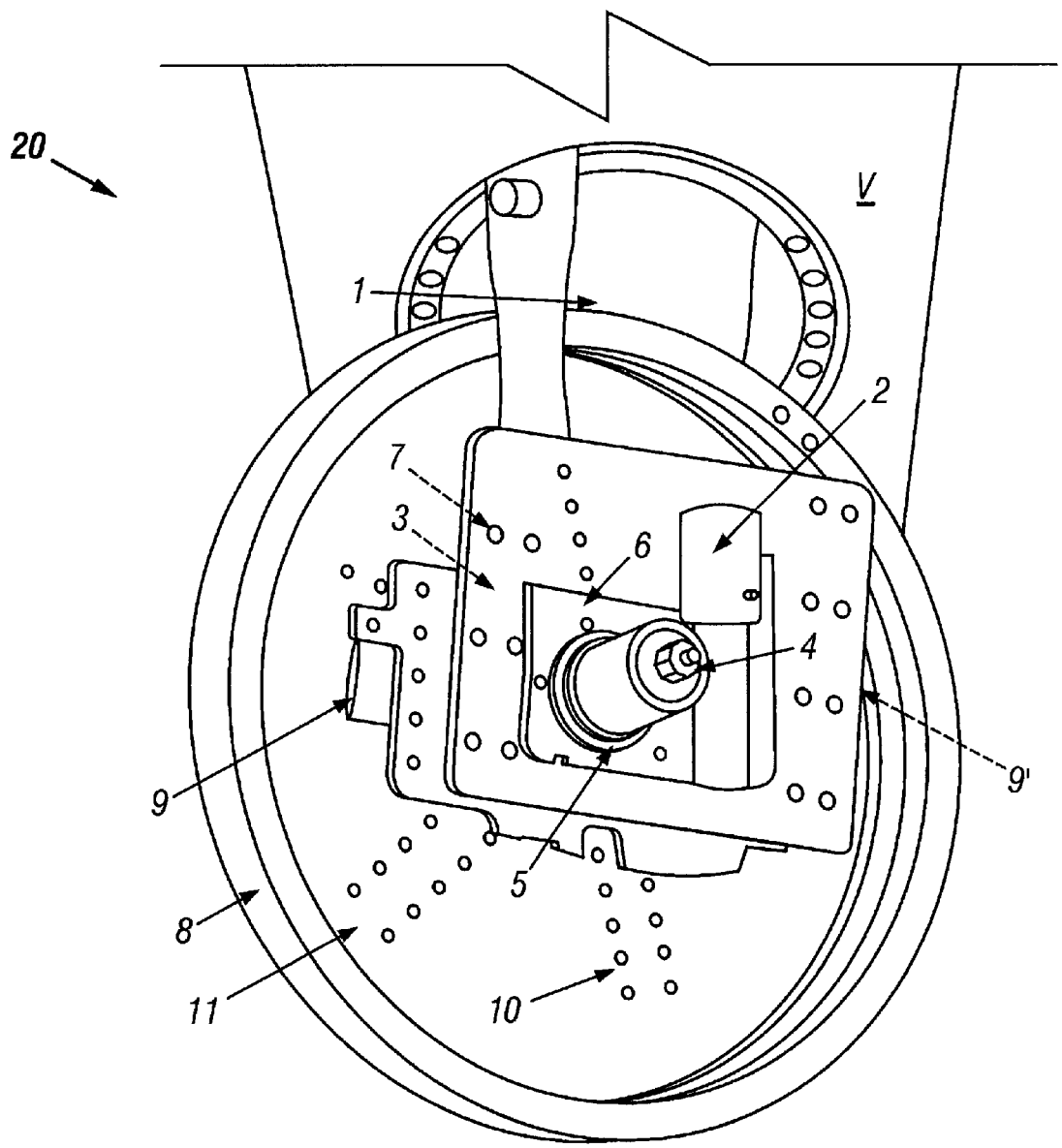
FIG. 8 is a drawing (based on a photograph) of an example of the wheel suspension assembly of FIG. 1, showing the wheel in operative position for use in a vehicle, in slightly oblique elevation view with the wheel in the background and the hub assembly in front.
Figure 9:
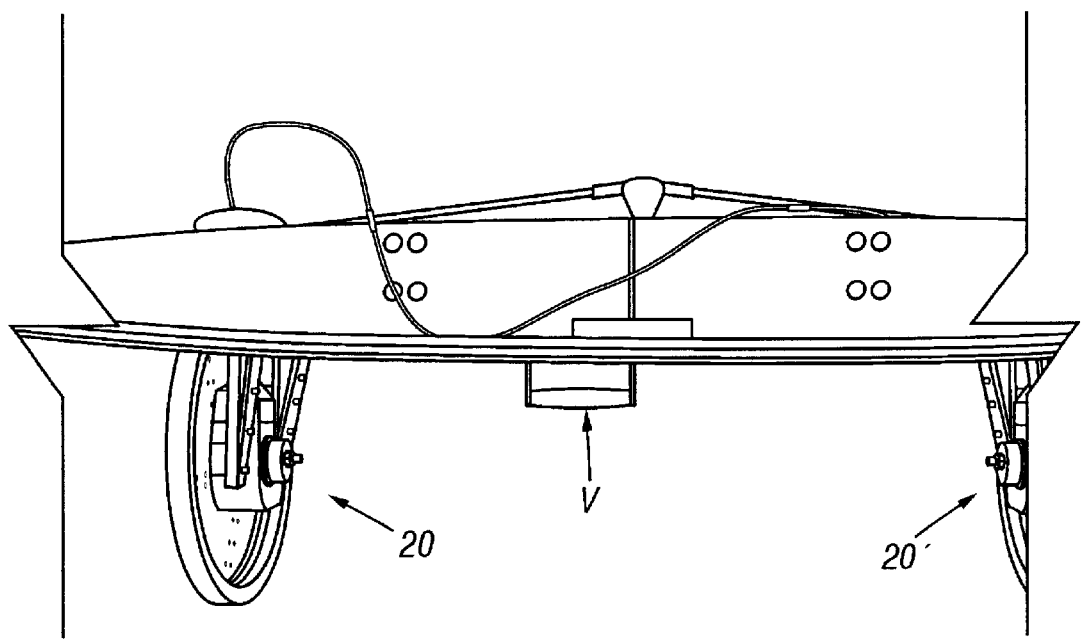
FIG. 9 is a drawing (based on a photograph) of two of the wheel suspensions of FIG. 6, as mounted to the front of a light 3-wheeled research vehicle chassis, as seen from the front.

FIGS. 2 through 6 are schematic views of one embodiment 21 of the wheel suspension of the invention, simplified somewhat for purposes of clarity. This embodiment 21 is generally similar to the embodiment 20 of FIG. 1, and the same nomenclature is used to describe its component elements. Conventional fasteners, weldments, bonding means, threads, spacers, brackets, clamps and the like are omitted in the figures for clarity. The embodiment 21 is shown without a braking system, although one may be included as shown in FIGS. 1, 8 and 9.

Figure 2:
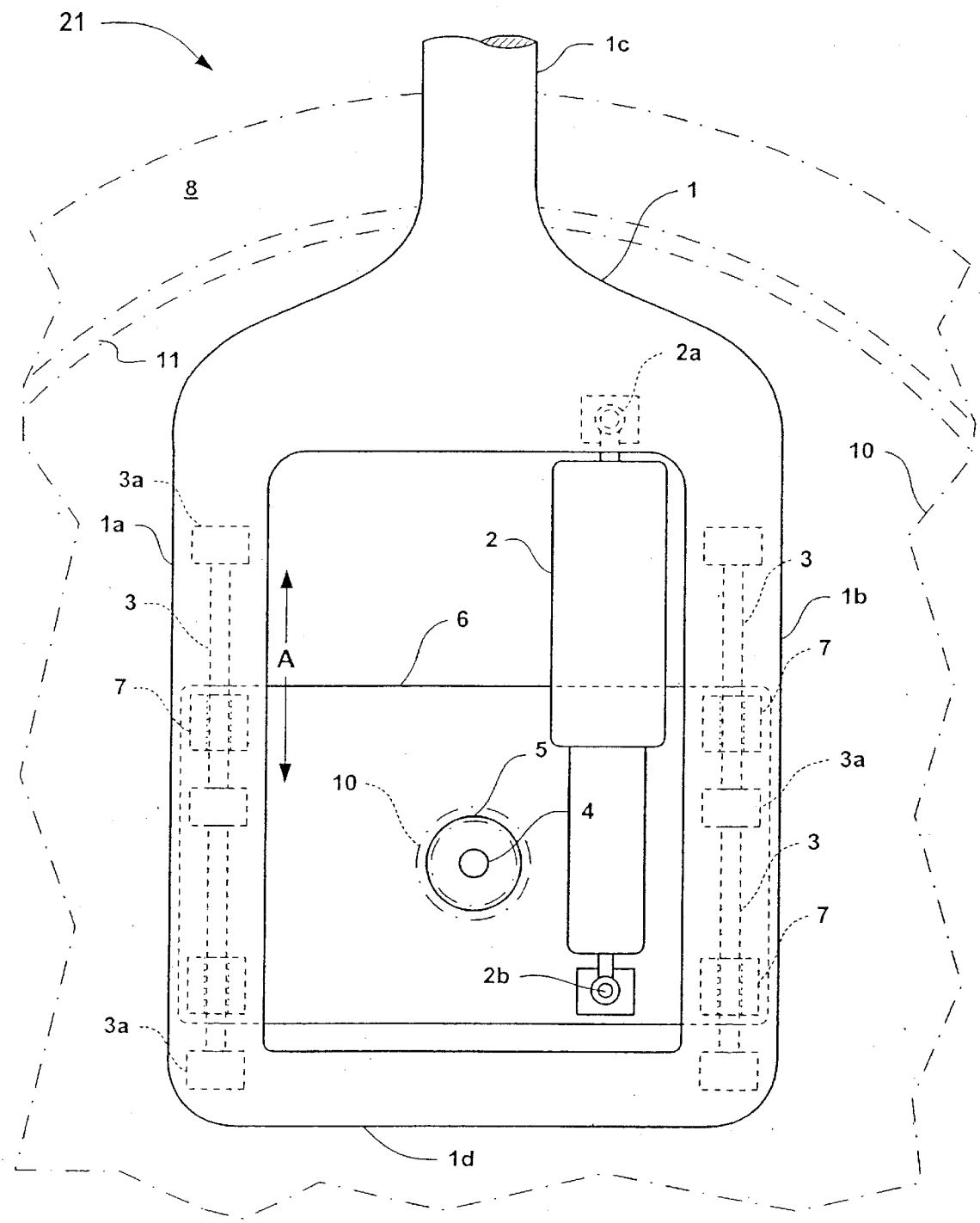
FIG. 2 is a schematic front elevation view of one embodiment of the wheel suspension of the invention seen from the side with the suspension fork in the foreground and the wheel in the background.
Figure 3:
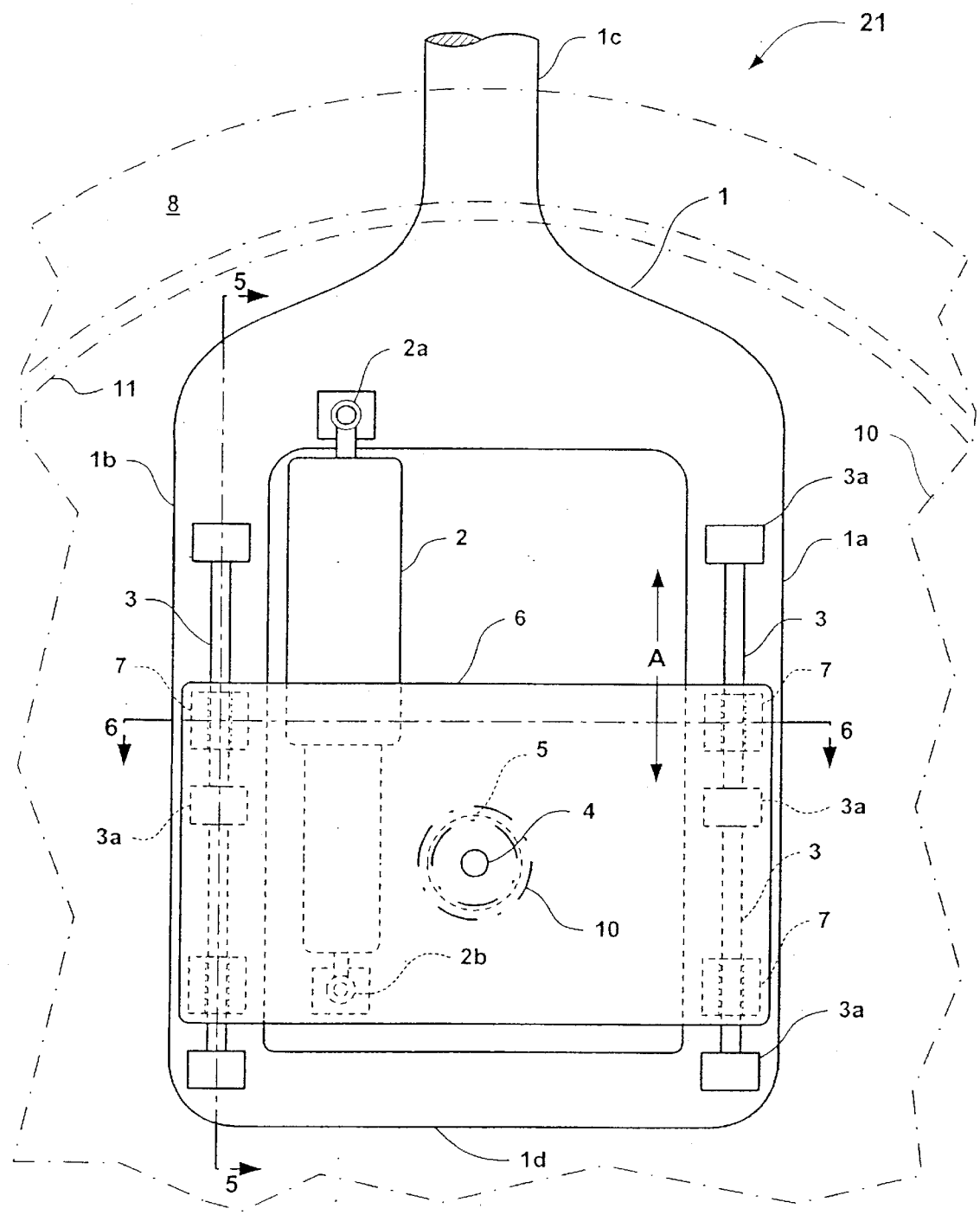
FIG. 3 is a reverse elevation view of the wheel suspension of FIG. 2, seen from the opposite face with the wheel in the foreground and the suspension fork in the background.
Figure 4:
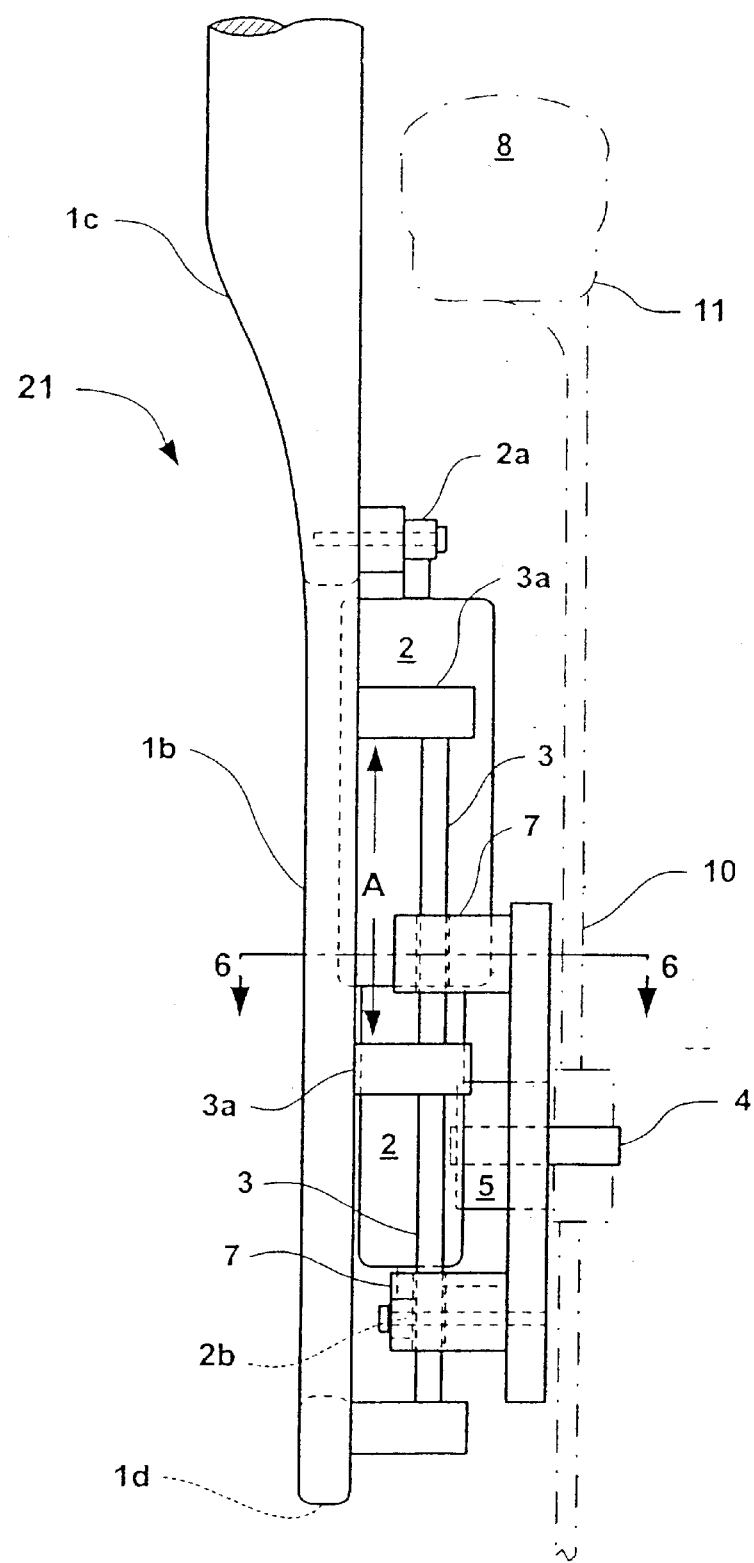
FIG. 4 is a side elevation view of the wheel suspension of FIG. 2 and 3, as seen from the left side of FIG. 3.

FIG. 2 is a front elevation view of the wheel suspension 21 seen from the side with the suspension fork 1 in the foreground and the wheel 10 (shown as phantom lines) in the background. FIG. 3 is a reverse elevation view of the wheel suspension of FIG. 2, seen from the opposite face with the wheel 10 in the foreground and the suspension fork 1 in the background. FIG. 4 is a side elevation view of the wheel suspension of FIG. 2 and 3, as seen from the left side of FIG. 3, the wheel 10 being on the right side and the fork 1 being on the left.

In FIGS. 2–4, the suspension frame or fork 1 may be seen to comprise an upper strut portion 1c which connects to bifurcated left and right fork tine portion 1a and 1b, respectively, which are spaced apart extending downward from the fork strut portion 1c. The lower ends of the fork tine portions 1a and 1b are preferably joined by fork closure portion 1d, to increase the structural integrity of the fork assembly 1. The hub plate assembly 6 is slidably mounted to the forks 1a and 1b by a slide and rail mechanism comprising a pair of elongate rail 3, one of the pair mounted in vertical parallel alignment along each of tines 1a and 1b. There is a corresponding slide 7 mounted on each side of hub plate 6 in parallel alignment to engage rails 3, so that the hub plate 6 is free to move vertically through a selected range of motion while being restrained from lateral or side-to-side movement. By this means, the motion of the hub plate 6 is restricted to a single degree of freedom, i.e., motion in the direction of double arrow A.

In the exemplary embodiment 21, the rail is a generally circular rod 3 mounted to the fork 1a,b by means of two or more rail mounts 3a, with one rail mount at each end of rail 3. Note that an optional third rail mount 3a is shown adjacent the midpoint of rail 3, so as to provide additional support to the rail 3 without restricting the range of motion of the slides 7.

A conventional shock absorber 2, is mounted generally parallel to the forks 1a,b and rails 3, the shock absorber attaching at its upper end via shock mount 2a to the base of the fork strut portion 1c, and at its lower end via shock mount 2b to the hub plate 6. Thus mounted, the shock absorber 2 acts to exert a spring reaction and to dampen motion of plate 6. The shock absorber is selected to match anticipated wheel loads while maintaining a desired operative range of motion of plate 6.

Note that the shock absorber 2 is partially recessed in the gap between the fork tines 1a and 1b, resulting in a compact arrangement. However, if desired, a continuous plate-like suspension frame structure may be substituted for the bifurcated forks 1a,b, the spacing between the frame and the hub plate 6 being selected to provide clearance for shock absorber 2.

The hub mount plate 6 mounts a hub bearing 5 which ratably mounts an axle 4. In a typical application of the suspension 21 to a wheeled vehicle, the hub assembly 5 is secured to the wheel 10 (shown in phantom lines) via the axle 4. The rim 11 of the wheel 10 shown mounts a tire 8.

Figure 5:
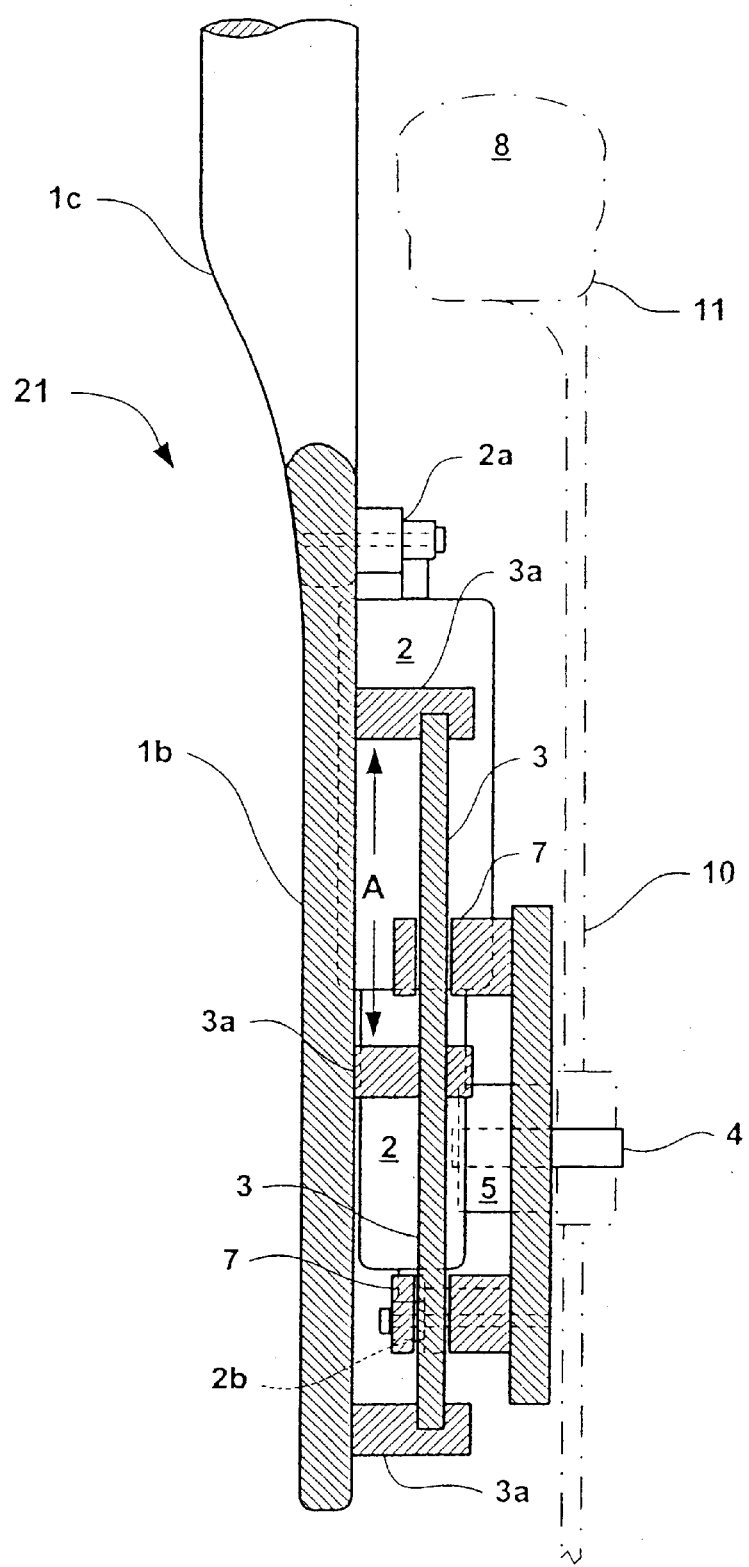
FIG. 5 is a cross section view of the wheel suspension of FIG. 2 to 4, as cut along Line 5—5 in FIG. 3.
Figure 6:
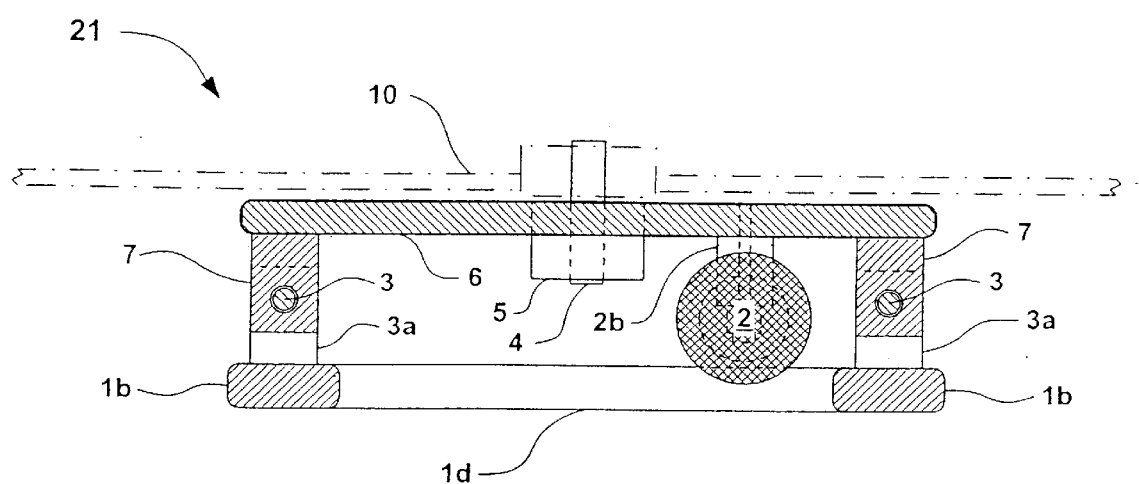
FIG. 6 is a cross section view of the wheel suspension of FIGS. 2 to 4, as cut along Line 6—6 in FIGS. 3 and 4.

FIGS. 5 and 6 are cross-sections of the wheel suspension 21 showing particularly the structure of the rail-and-slide mechanism 3, 7. FIG. 5 is a cross section view of the wheel suspension of FIGS. 2 to 4, as cut along Line 5—5 in FIG. 3, corresponding to the view direction of FIG. 4. FIG. 6 is a cross section view of the wheel suspension of FIGS. 2 to 4, as cut along Line 6—6 in FIGS. 3 and 4, corresponding to the view downward from above. Note that there is sufficient clearance between rail 3 and slide 7 to permit free vertical motion of plate 6. Optionally, bushings, roller bearings or other friction/wear reduction devices may be include at the point of contact of rails 3 and slides 7. As best seen in FIGS. 5 and 6, the components of the suspension are largely housed within the volume defined by the wheel 10 and rim 11, even in the case of a thin profile wheel 8.

FIGS. 7A to 7D show a portion of exemplary embodiments of the wheel suspension of the of the invention including alternative sliding mount assemblies 22–25 connecting the suspension fork 1 with the hub plate 6. Each figure shows a portion of the wheel suspension approximately corresponding in view to the left half cross-section of FIG. 6.

FIG. 7A shows an embodiment 22 including a sliding mount assembly generally similar to that shown in FIGS. 2–6, but with the orientation reversed, i.e., with rail 3' mounted via rail mounts 3a' to the hub plate 6, engaging slider 7' which is mounted to fork 1b.

FIG. 7B shows an embodiment 23 including a sliding mount assembly comprising a integral cross-section including a base portion 33 and bulb-like extension portion 34. The bulb extension engages a slider cross-section 31 having a key-hole type slot 32 conforming the bulb shape 34. Both sections 31 and 33 may be integral extrusions, cut to a selected length to permit a selected range of motion of hub plate 6 and mounted to the plate 6 and fork 1b by conventional fasteners or bonding methods (not shown).

FIG. 7C shows an embodiment 24 including a sliding mount assembly in which the fork tine 1b (and 1a) has at least a portion of constant cross section 1b' which parallel to the opposite tine and serves as an integral rail. In the example shown, the fork 1b' has a circular cross section which engages slider 35 mounted to hub plate 6', and having a ring portion 36 which surrounds fork/rail portion 1b'.

FIG. 7D shows an embodiment 25 including a sliding mount assembly in which a rail portion 39 is formed in the lateral margin of plate 6', and mounted to engage corresponding side slots 38 in mounting brackets 37. The rail portion 39 is secured in side slot 38 by the engagement of a mirror image rail/slot pair (not shown) on the opposite side of plate 6'.

FIG. 8 is a drawing (based on a photograph) of an example of the wheel suspension assembly 20 of FIG. 1, showing the wheel 8 in operative position for use in a vehicle V, in slightly oblique elevation view with the wheel in the background and the hub assembly in front. The wheel suspension assembly 20 mounts a wheel 10 and tire 8. Note the brake pistons and pads 9, 9' mounted facing outwards on opposite sides of hub plate 6, to permit frictional engagement of wheel rim 11.

FIG. 9 is a drawing (based on a photograph) of an exemplary installation o two of the wheel suspensions 20, and 20' of FIG. 8, as mounted to the front of a light 3-wheeled vehicle chassis V as seen from the front. The wheel suspension assemblies 20 and 20'may be seen on the left and right sides of the figure. The suspension assembly 20 may be provided with a conventional aerodynamic fairing (not shown) covering side of the suspension assembly 20 opposite the wheel 10.

Industrial Applicability:

It is clear that in-wheel suspension of the invention has wide applicability in providing a compact, streamlined wheel suspension assembly. The inventive in-wheel suspension may be used in all types of vehicles, such as vehicles powered by conventional gasoline or diesel engines, and electric or solar powered vehicles. In a modified version, the in-wheel assembly may comprise the novel suspension assembly including an electric motor adapted for controlling the stiffness of the suspension, for generating electricity or for direct drive of the wheel.

In addition to on-road and off-road ground vehicles, the in-wheel suspension of the invention may be usefully employed in other wheeled applications, such as aircraft landing gear, flying boat beaching gear, toy vehicles, amusement and thrill ride vehicles, bicycles, scooters, and non-vehicle applications such as assembly line conveyer belt suspensions, machinery, and the like.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What is claimed is:

1. A wheel suspension for resiliently mounting a wheel, comprising:
   (a) a hub plate assembly having a wheel hub including an axle and bearings to permit the mounting thereto of at least a wheel;
   (b) a suspension frame;
   (c) an inter-engaging sliding mount assembly slidably connecting the hub plate assembly to the suspension frame, said sliding mount assembly permitting sliding motion of the hub plate assembly in a single line of motion relative to the suspension frame; and
   (d) a spring mechanism linked between the hub plate assembly and the suspension frame, said spring mechanism controlling the sliding motion of the hub plate assembly so as to resiliently support loads applied to the hub plate assembly from the wheel.

2. The wheel suspension of claim 1, wherein the suspension frame is configured to lie generally on a single side of said wheel.

3. The wheel suspension of claim 2, wherein the hub plate assembly has a maximum dimension in a plane parallel to the plane of the wheel which does not exceed the overall diameter of the wheel inclusive of the rim of said wheel.

4. The wheel suspension of claim 2, wherein
   (a) the wheel has a rim, the wheel and rim forming a concave surface within said rim;
   (b) the hub plate assembly is configured so that the hub plate assembly lies substantially within the internal volume deifined by the concave surface.

5. The wheel suspension of claim 2, wherein the spring mechanism includes a motion damping mechanism.

6. The wheel suspension of claim 5, wherein the spring mechanism comprises a conventional piston-type shock absorber mounted to resiliently connect the e hub plate assembly and the suspension frame.

7. The wheel suspension of claim 6 comprising multiple shock absorbers.

8. The wheel suspension of claim 2, wherein the inter-engaging sliding mount assembly comprises:
   (a) at least one elongate rail fixed to one of the suspension frame and the hub plate assembly;
   (b) at least one sliding rail mount fixed to the other of the suspension frame and the hub plate assembly; and
   (c) at least one sliding rail mount slidably engaging the rail so as to permit sliding motion of the hub plate assembly in a single line of motion along the elongate rail.

9. The wheel suspension of claim 8, wherein:
   (a) the suspension frame includes at least two spaced-apart opposing fork tines, one of the fork tines mounting a first elongate rail and the other of the fork tines mounting a second elongate rail in generally parallel alignment with the first rail.
   (b) the hub plate assembly mounts at least one sliding rail mount which slidably engages the first rail and at least one sliding rail mount which slidably engages the second rail.

10. The wheel suspension of claim 8 wherein the rails are made of metal.

11. The wheel suspension of claim 2, comprising a wheel brake mechanism mounted to the hub plate.

12. The wheel suspension of claim 2, wherein said spring mechanism includes a means for controlling the suspension stiffness.

13. The wheel suspension of claim 2, wherein said spring mechanism includes a means for controlling the position of the hub plate assembly along the rails relative to the position of the suspension frame.

14. The wheel suspension of claim 2, comprising a wheel drive motor mounted to the hub plate.

15. The in-wheel suspension of claim 12 wherein the motor is adapted to produce electricity.

16. The wheel suspension of claim 2 wherein the sliding rail mount comprises a linear bearing.

* * * * *